(12) United States Patent
Agarwal et al.

(10) Patent No.: US 8,977,587 B2
(45) Date of Patent: Mar. 10, 2015

(54) SAMPLING TRANSACTIONS FROM MULTI-LEVEL LOG FILE RECORDS

(71) Applicant: International Business Machines Corporation, Armonk, NY (US)

(72) Inventors: Manoj K. Agarwal, Noida (IN); Curt L. Cotner, Gilroy, CA (US); Amitava Kundu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/733,452

(22) Filed: Jan. 3, 2013

(65) Prior Publication Data

US 2014/0188783 A1  Jul. 3, 2014

(51) Int. Cl.
| | | |
|---|---|---|
| *G06F 7/00* | (2006.01) | |
| *G06F 17/00* | (2006.01) | |
| *G06F 17/30* | (2006.01) | |
| *G06F 11/34* | (2006.01) | |
| *G06F 15/16* | (2006.01) | |

(52) U.S. Cl.
CPC ...... *G06F 17/30563* (2013.01); *G06F 11/3476* (2013.01); *G06F 17/30227* (2013.01); *G06F 11/3466* (2013.01)
USPC ............................ 707/602; 707/688; 707/703

(58) Field of Classification Search
CPC ....................... G06F 17/30563; G06F 11/3476
USPC ......................................... 707/688, 602, 703
See application file for complete search history.

(56) References Cited

U.S. PATENT DOCUMENTS

| | | | |
|---|---|---|---|
| 5,907,848 A * | 5/1999 | Zaiken et al. ............ | 707/999.01 |
| 5,974,563 A * | 10/1999 | Beeler, Jr. .............. | 707/999.202 |
| 7,308,447 B2 | 12/2007 | Chickering et al. | |
| 7,668,793 B2 | 2/2010 | Beekmann et al. | |
| 7,797,326 B2 | 9/2010 | Gopalan et al. | |
| 7,818,630 B2 | 10/2010 | Hendrickson et al. | |
| 7,873,605 B2 * | 1/2011 | Bhattacharyya et al. ..... | 707/685 |
| 8,468,134 B1 * | 6/2013 | McHugh et al. .............. | 707/688 |
| 8,717,917 B1 * | 5/2014 | Balakrishnan et al. ........ | 370/252 |
| 2008/0228834 A1 * | 9/2008 | Burchall et al. ....... | 707/999.202 |
| 2009/0125563 A1 * | 5/2009 | Wong et al. ................ | 707/999.2 |
| 2009/0144011 A1 | 6/2009 | Kumar Nath | |
| 2011/0055232 A1 | 3/2011 | Graefe | |
| 2012/0030184 A1 * | 2/2012 | Driesen et al. ................ | 707/703 |

OTHER PUBLICATIONS

Abhijit Pol, Christopher Jermaine and Subramanian Arumugam. Maintaining very large random samples using the geometric file. The VLDB Journal vol. 17, issue 5, pp. 997-1018, Aug. 2008.*
Backstrom, L. and Kleinberg, J. "Network Bucket Testing". WWW 2011—Session: Social Network Algorithms. Mar. 28-Apr. 1, 2011, Hyderabad, India. pp. 615-624.

(Continued)

*Primary Examiner* — Greta Robinson
*Assistant Examiner* — Brian E. Weinrich
(74) *Attorney, Agent, or Firm* — David J. Zwick (57) ABSTRACT

A log file contains operation records, each operation record is of a certain type, and each operation record is associated with a transaction. A plurality of operation records is read from the log file into a record store. Records of the plurality of operation records of each operation record type are sampled at a predefined sampling rate. Operation records in the plurality of operations records are identified that are associated with completed transactions of which the sampled operation records are associated. The identified operation records are then extracted from the record store into a data store.

8 Claims, 11 Drawing Sheets

(56) References Cited

OTHER PUBLICATIONS

Bharat, K. and Broder, A. "A Technique for Measuring the Relative Size and Overlap of Public Web Search Engines". Estimating the Relative Size and Overlap of Public Web Search Engines. Digital, Systems Research Center. Palo Alto, CA. Oct. 6, 2004.

Chakaravarthy, V. et al. "Analysis of Sampling Techniques for Association Rule Mining". ICDT 2009, Mar. 23-25, 2009. Saint Petersburg, Russia. Copyright 2009. pp. 276-283.

Henzinger, M. et al. "On Near-Uniform URL Sampling". Computer Networks 33 (2000). pp. 295-308.

Pol, A. et al. "Maintaining Very Large Random Samples Using the Geometric File". The VLDB Journal.

Toivonen, H. "Sampling Large Databases for Association Rules". Proceedings of the 22nd VLDB Conference, Mumbai (Bombay), India 1996.

U.S. Appl. No. 13/483,778, filed May 30, 2012, Agarwal, M. et al., Applicant, Unpublished.

* cited by examiner

SAMPLING TRANSACTIONS FROM MULTI-LEVEL LOG FILE RECORDS

FIELD OF THE INVENTION

The present invention relates generally to the field of sampling of data records, and more particularly to sampling of sub-record types of multi-level records followed by retrieval of the full multi-level record.

BACKGROUND OF THE INVENTION

Sampling of database transactions from a database transactions log file can provide useful information about the database performance and environment. If the transactions are single-level transactions, that is, each transaction is only a single database operation, for example, one SQL statement, then the sampling of transactions from the log file is rather straight forward. Typically, database transactions are multi-level transactions. Each transaction can include several database operations. In addition, while the database operation records for a transaction will usually appear in the proper order in the database transaction log file, the database operation records from multiple transactions can be intermixed. With multi-level transactions, to sample a database transaction from the log file requires identifying and extracting all the database operation records associated with the transaction. These factors can complicate sampling of transactions from a database transaction log file.

SUMMARY

Embodiments of the present invention disclose a method, computer program product, and system for sampling transactions from multi-level log file records. A log file contains operation records, each operation record is of a certain type, and each operation record is associated with a transaction. A plurality of operation records is read from the log file into a record store. Records of the plurality of operation records of each operation record type are sampled at a predefined sampling rate. Operation records in the plurality of operations records are identified that are associated with completed transactions of which the sampled operation records are associated. The identified operation records are then extracted from the record store into a data store.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 7:
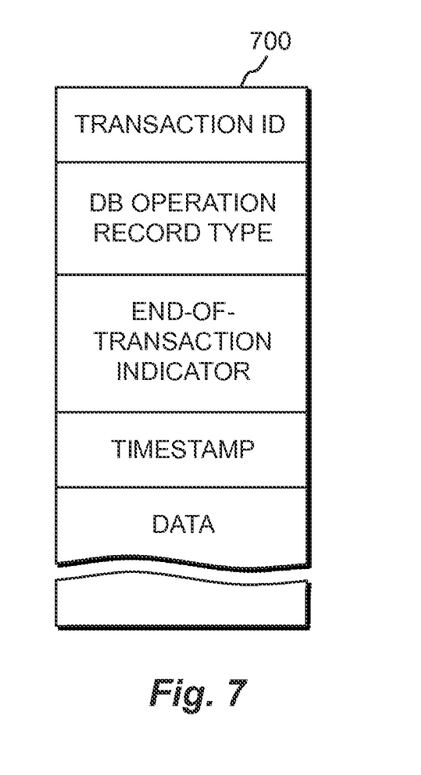
FIG. 7 illustrates an operation record layout of a multi-level transaction record, in accordance with an embodiment of the present invention.

Embodiments of the invention operate generally to sample database operation records of multi-level transactions in a transaction log file to provide at least a minimum representative sample of each type of database operation record. FIG. 7 illustrates a record layout of an operation record 700 of a multi-level transaction, in accordance with an embodiment of the invention. Operation record 700 may include, for example, a transaction identification field, a database operation record type field, an end-of-transaction indicator field, and may include additional fields, such as a timestamp field, a data field, etc. For a multi-level transaction, i.e., a transaction that may include several database operations, execution of the multi-level transaction may result in multiple operation records 700 one for each database operation of the transaction being written to the transaction log file. Since analysis is typically performed at the transaction level, the complete transaction to which the sampled database operation record belongs is extracted from the log file. In first embodiments of the invention, the log file is divided into sample sets, for example, a certain percentage of the log file record count, or a fixed number of log file records, and each sample set is processed in turn. As a sample set is read from the log file, the database operation records are split out based on the type of database operation. When a sample set has been read, each database operation type is sampled. For example, a fixed number of samples are randomly selected for each database operation type. After all database operation types have been sampled, and the complete transactions of each sampled database operation record have been extracted, the next sample set is processed.

In second embodiments of the invention, sampling occurs as the transaction log file is read. A sample proportion or sample proportions by operation type are defined, for example 15% for all operation types. Each separate database operation type is regularly sampled at a rate approximately equal to its associated sample proportion. For each database operation type record sampled, the complete transaction associated with the sampled record is extracted for follow-on analysis.

Figure 1:
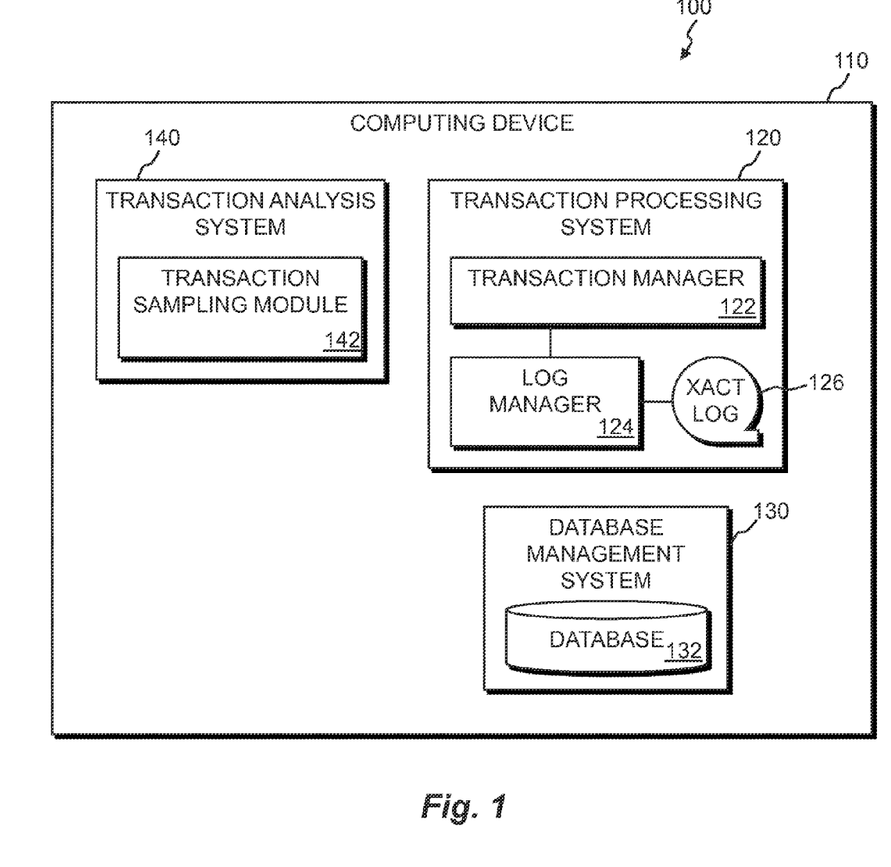
FIG. 1 is a functional block diagram of a transaction sampling system in accordance with an embodiment of the present invention.

The present invention will now be described in detail with reference to the figures. FIG. 1 is a functional block diagram illustrating a transaction sampling system 100 in accordance with an embodiment of the present invention. Transaction sampling system 100 includes computing device 110, which further includes transaction processing system 120, database management system 130, and transaction analysis system 140.

In preferred embodiments of the invention, computing device 110 can be, for example, a mainframe or mini computer, a laptop, a netbook personal computer (PC), or a desktop computer. Transaction sampling system 100 is shown as being wholly implemented on computing device 110. However, transaction sampling system 100 may operate in a distributed environment in which one or more of its components are implemented across a plurality of computing devices that communicate over a network, such as a local area network (LAN) or a wide area network (WAN) such as the Internet. For example, transaction analysis system 140 may operate on a separate computing device having sufficient capabilities to support only the operation of the transaction analysis system. In general, transaction sampling system 100 can execute on any computing device 110, or combination of computing devices, satisfying desired implementation requirements, and as described in relation to FIG. 6.

Transaction processing system 120 includes transaction manager 122, log manager 124, and transaction log file 126. Transaction manager 122 manages the processes that execute transactions against database 132 via database management system 130. Transaction manager 122 also manages all transactions so as to maintain data consistency in database 132. This is accomplished through the use of log manager 124. Log manager 124, among its other activities, records each transaction operation of a transaction workload, such as the execution of SQL statements in a transaction, in a database operation record to transaction log file 126.

Figure 6:
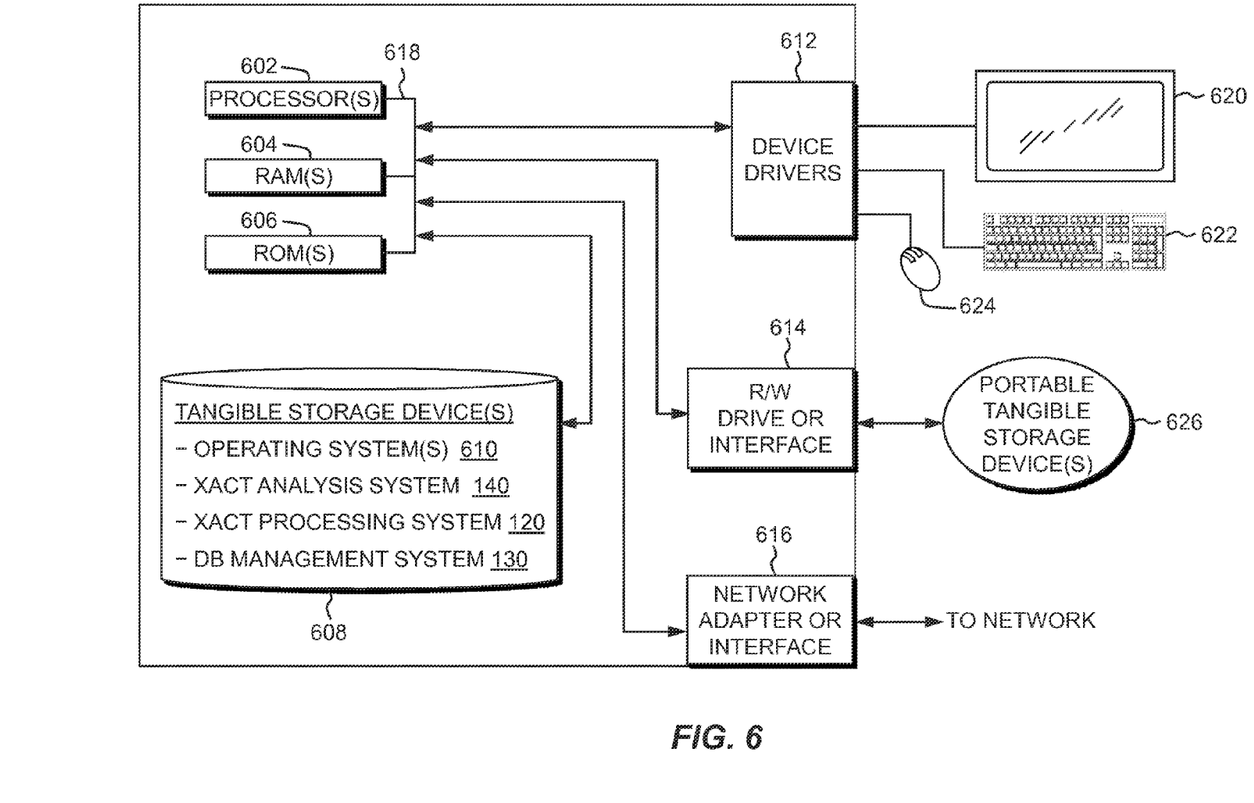
FIG. 6 is a block diagram of components of the computing device of the transaction sampling system of FIG. 1, in accordance with an embodiment of the present invention.

Database management system 130 includes database 132, which may reside, for example, on tangible storage device 608 (see FIG. 6). Database management system 130 manages access to database 132, and manages the resources associated with database 132, such as disk space.

Transaction analysis system 140 operates generally to analyze executions of a transaction workload, and provide, for example, systems and applications programmers and systems administrators information to determine, for example, the most efficient organization of a database 132, or of a transaction workload, or for determining the most efficient database management system 130 or transaction processing system 120. The information that transaction analysis system 140 processes is derived from transaction log file 126. For example, the transaction log file 126 information pertaining to executions of a transaction workload are stored on disk, such as tangible storage device 608, after each transaction workload completes, and this information is made available to transaction analysis system 140 for analysis.

Transaction analysis system 140 includes transaction sampling module 142, which is the focus of the present invention. Transaction sampling module 142, the operation of which is described in more detail below, operates generally to sample database operation records from transaction log file 126 at the database operation type, and then to identify and extract all database operation records for the transactions of the sampled records so as to have complete multi-level transactions. These multi-level transactions may then be analyzed by transaction analysis system 140 to provide, for example, the performance information described above.

Embodiments of the invention are described with respect to the components and their functionality as presented in FIG. 1. Other embodiments of the invention may perform the invention as claimed with different functional boundaries between components. For example, the functionality of transaction sampling module 142 may be implemented as a standalone component, or as a function of transaction processing system 120.

In embodiments of the invention, various constraints and assumptions apply. One constraint is that only complete multi-level transactions are extracted by transaction sampling module 142 from transaction log file 126. Thus, if a database operation record is sampled, all other database operation records belonging to the same multi-level transaction should be extracted from transaction log file 126. If the full transaction cannot be extracted, then the transaction should be rejected as far as transaction sampling is concerned.

One operating assumption is that all database operation records for a transaction will appear in transaction log file 126 in the order of execution within the transaction. Thus, if an end-of-transaction database operation record appears in transaction log file 126, then no other database operation record for this transaction will appear in the transaction log file following the end-of-transaction record.

Another operating assumption is that all database operation records for a transaction will be found within a certain defined transaction span. As mentioned above, the database operation records in transaction log file 126 from the multi-level transactions of a workload can be intermixed. In other words, the database operation records of a subsequent multi-level transaction can appear in transaction log file 126 before the end-of-transaction database operation record of a previous multi-level transaction. Thus, the transaction span should be larger than the number of transactions found in the multi-level transaction of the transaction workload having the largest number of database operations. The transaction span is typically based on an input to the algorithm, for example 500 records, and can be based on actual statistics related to the transaction span for various transaction workloads. The transaction span can be adjusted, for example, to accommodate performance and accuracy considerations.

Figure 2:
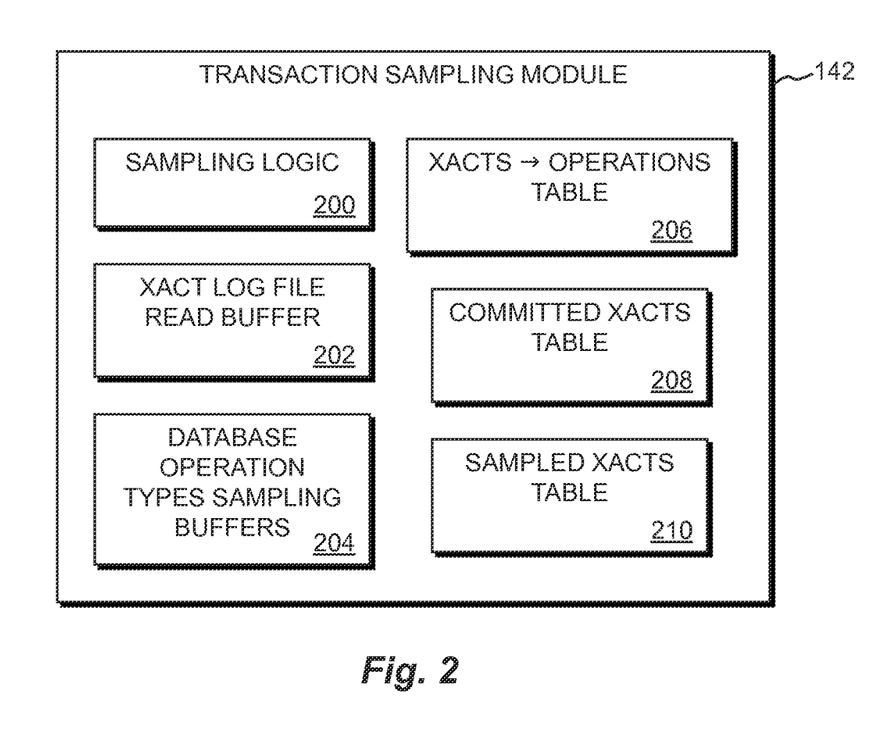
FIG. 2 is a functional block diagram of a transaction sampling module of the transaction sampling system illustrated in FIG. 1, in accordance with first embodiments of the present invention.

FIG. 2 is a functional block diagram of transaction sampling module 142 of transaction sampling system 100 illustrated in FIG. 1, in accordance with a first embodiment of the present invention. In a first embodiment, transaction sampling module 142, the operation of which is explained in more detail below, includes sampling logic module 200, transaction log file read buffer 202, database operation types sampling buffers 204, transactions-to-operations table 206, committed transactions table 208, and sampled transactions table 210. Sampling logic module 200 contains programming code, firmware logic, hardware, or a combination of these, to control the operations associated with performing the database operations record sampling and transaction extraction.

Transaction log file read buffer 202 stores the database operation records in a sample set of the transaction workload read from log file 126. In a first embodiment, the size of transaction log file read buffer 202 is at least the number of records in a sample set plus twice the transaction span. Transaction log file read buffer 202 will include the records from the sample set, plus a transaction span of records both before and after the sample set. The transaction spans before and after the sample set will help to ensure that complete transactions for database operation records sampled at or near the beginning or end of the sample set will be available in transaction log file read buffer 202 for extraction.

Database operation types sampling buffers 204 is a set of buffers that includes one buffer for each type of database operation record that is desired to be sampled in the transaction workload. The size of each buffer should be enough to store the largest number of records of the specific type likely to be included in a sample set. In some embodiments, database operations records are written to locations in database operation types sampling buffers 204. In other embodiments, pointers to database operations records in transaction log file read buffer 202 are written to locations in database operation types sampling buffers 204, for example, buffer addresses or record references.

Transactions-to-operations table 206 will include an entry for each different transaction included in a sample set and the pre- and post-sample set transaction span on either side of the sample set, and will include sub-entries associated with each transaction entry for each database operation record belonging to the transaction. Committed transactions table 208 will include an entry for each transaction to which an end-of-transaction database operation record in a sample set plus pre- and post-sample set transaction span belongs. Sampled transactions table 210 will include an entry for each transaction that is extracted from transaction log file read buffer 202.

Figure 3A:
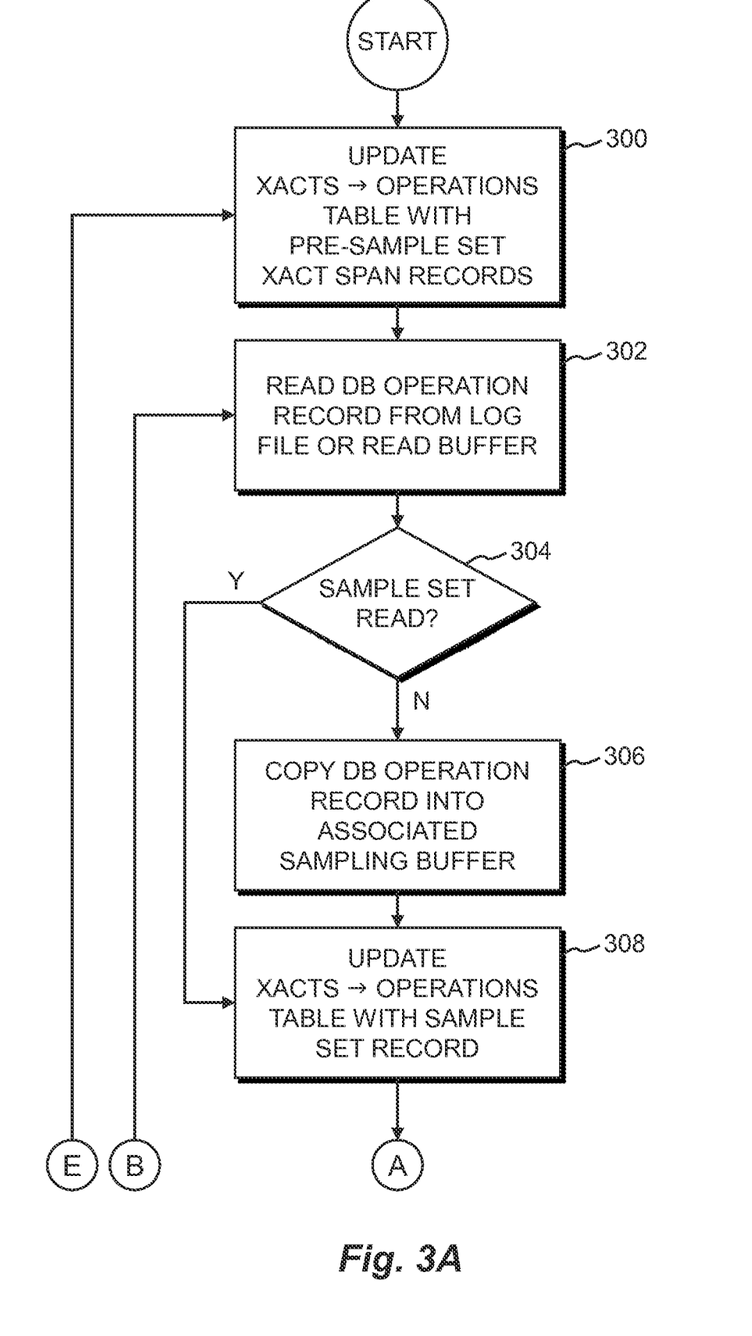
FIGS. 3A, 3B, and 3C are a flowchart depicting operational steps of the transaction sampling module of the transaction sampling system illustrated in FIG. 1, in accordance with first embodiments of the present invention.
Figure 3B:
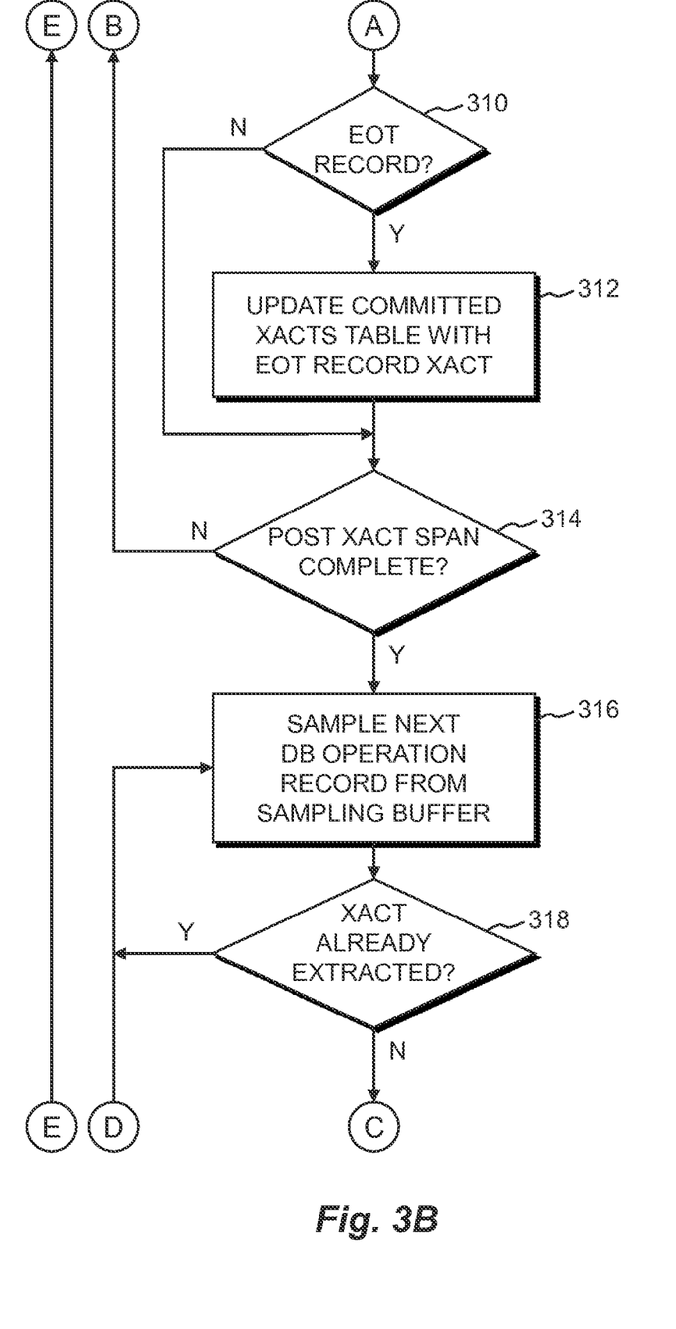
Figure 3C:
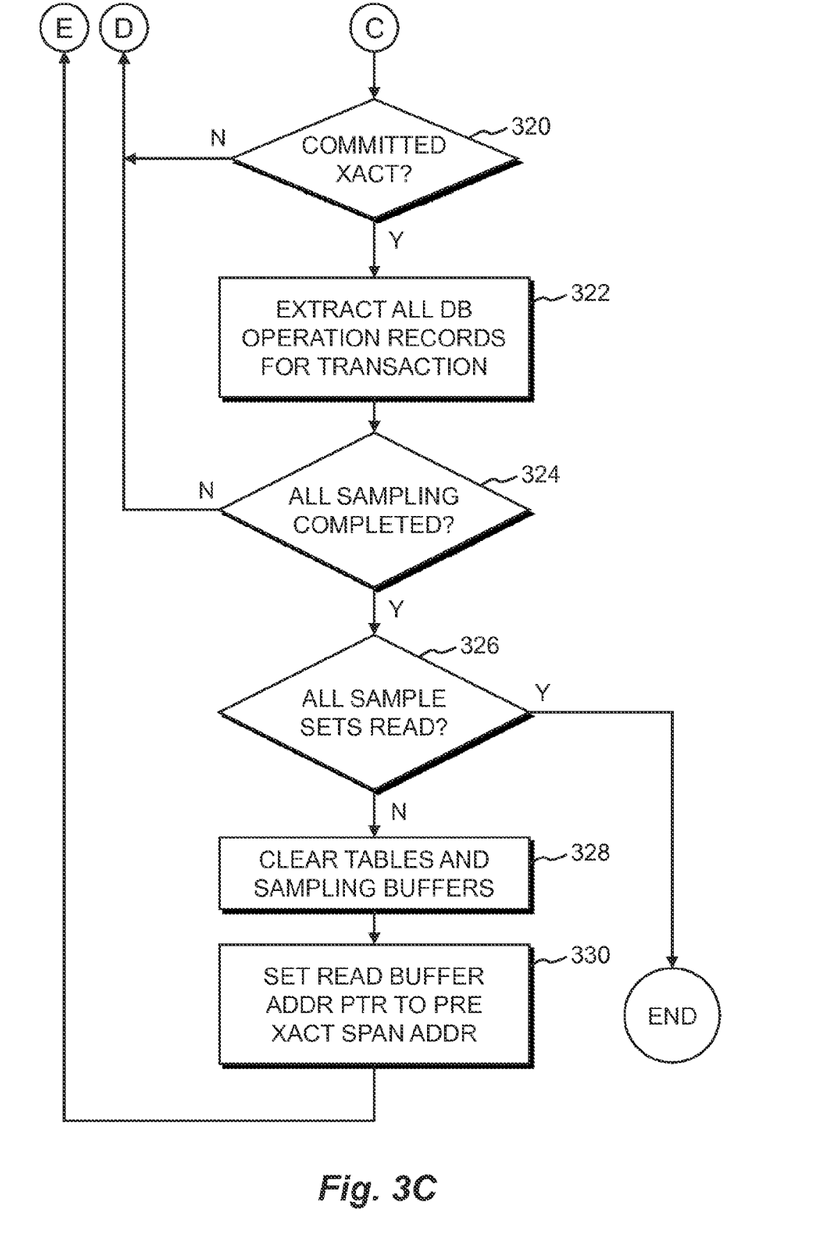

FIGS. 3A, 3B, and 3C are a flowchart depicting operational steps of transaction sampling module 142 of transaction sampling system 100 illustrated in FIG. 1, in accordance with first embodiments of the present invention. When a second or subsequent sample set is read from transaction log file 126 into transaction log file read buffer 202, the operation begins by processing the transaction span of records just prior to the sample set. These records will be in transaction log file read buffer 202 after processing the previous sample set, and the transaction log file read buffer address pointer will be set to the beginning record of the pre-sample set transaction span (see step 330). The pre-sample set transaction span records are read, and transactions-to-operations table 206 is updated for each record (step 300).

After transactions-to-operations table 206 is updated for each pre-sample set transaction span record (step 300), database operation records from the sample set are read one at a time (step 302). Because the post-sample set transaction span from the previous sample set processing is part of the current sample set, these database operation records can be read from the transaction log file read buffer 202. After the records in the post-sample set transaction span from the previous sample set have been read from transaction log file read buffer 202, the remaining records in the sample set, and the post-sample set transaction span for the current sample set processing, are read from transaction log file 126.

If all database operation records in the current sample set have not been read (decision step 304, "N" branch), the just-read record is, for example, copied into the appropriate database operation type sampling buffer 204 (step 306). The transactions-to-operations table 206 is then updated for the just-read record (step 308). If all database operation records in the current sample set have been read (decision step 304, "Y" branch), copying the just-read record into a database operation type sampling buffer 204 is skipped. In certain embodiments, counters can be defined to track record counts by type to determine actual counts and proportions by record type. Such information can be used, for example, in determining sampling proportions by record type.

If the database operation record is an end-of-transaction record (decision step 310, "Y" branch), an entry for the transaction is added to the committed transactions record table 208 (step 312). If the database operation record is not an end-of-transaction record (decision step 310, "N" branch), the committed transactions record table 208 is not updated.

If all database operation records for the current sample and all post-sample set transaction span records set have not been read in (decision step 314, "N" branch), the next database operation record is read from transaction log file read buffer 202 (step 302). If all database operation records for the current sample set and all post-sample set transaction span records have been read in (decision step 314, "Y" branch), sampling of database operation records from database operation types sampling buffers 204 begins (step 316).

In a first embodiment, sampling occurs for each type of database operation record by performing a random sampling of each of the database operation types sampling buffers 204. For example, as mentioned above, a certain number of samples can be selected from each of the sampling buffers to ensure that each database operation type record is sampled. In other embodiments, different sampling schemes may be used. For example, each database operation type can have a different sampling proportion. Because transaction analysis is typically performed at the transaction level, for each sampled database operation record sampled, the entire transaction is extracted for further analysis.

After a database operation record has been sampled from a database operation types sampling buffer 204 (step 316), sampling logic module 200 determines if the transaction to which the sampled database operation record belongs has already been extracted as a result of a previous database operation record sampling (decision step 318). If the transaction to which the sampled database operation record belongs has already been extracted (decision step 318, "Y" branch), no further processing for the sampled database operation record is done, and the next database operation record sampling is performed (step 316).

If the transaction to which the sampled database operation record belongs has not already been extracted (decision step 318, "N" branch), sampling logic module 200 determines if the transaction to which the sampled database operation record belongs has been committed, i.e., if a copy of the end-of-transaction record is in transaction log file read buffer 202 (decision step 320). If the transaction to which the sampled database operation record belongs has not been committed (decision step 320, "N" branch), no further processing for the sampled database operation record is done, and the next database operation record sampling is performed (step 316). If the transaction to which the sampled database operation record belongs has been committed (decision step 320, "Y" branch), sampling logic module 200 extracts all database operation records for the transaction, based on the corresponding entry in transactions-to-operations table 206, and adds an entry to sampled transactions table 210 (step 322).

If all sampling of the current sample set of database operations records from the database operation types sampling buffers 204 has not been completed (decision step 324, "N" branch), the next database operation record is sampled from the database operation types sampling buffers 204 (step 316). If all sampling of the current sample set has been completed (decision step 324, "Y" branch), sampling logic module 200 determines if all sample sets have been processed (decision step 326). If all sample sets of the transaction workload have been processed (decision step 326, "Y" branch), processing ends. If all sample sets have not been processed (decision step 326, "N" branch), setup for processing of the next sample set is performed. Transaction-to-operations table 206, committed transactions table 208, and database operation types sampling buffers 204 are cleared (step 328). The read pointer for transaction log file read buffer 202 is also set back to the address of the first record of the pre-sample set transaction span (step 330). Then processing of the pre-sample set transaction span records for the next sample set is performed (step 300).

Figure 4:
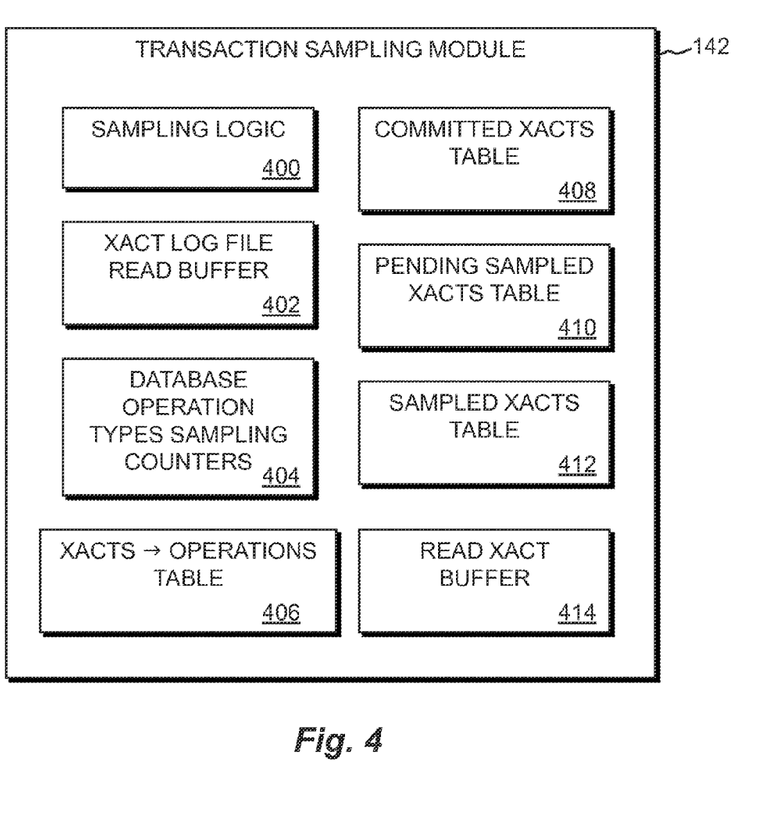
FIG. 4 is a functional block diagram of a transaction sampling module of the transaction sampling system illustrated in FIG. 1, in accordance with second embodiments of the present invention.

FIG. 4 is a functional block diagram of transaction sampling module 142 of transaction sampling system 100 illustrated in FIG. 1, in accordance with second embodiments of the present invention. In a second embodiment, transaction sampling module 142, the operation of which is explained in more detail below, includes sampling logic module 400, transaction log file read buffer 402, database operation types sampling counters 404, transactions-to-operations table 406, committed transactions table 408, pending sampled transactions table 410, sampled transactions table 412, and read transactions buffer 414. Sampling logic module 400 contains programming code, firmware logic, hardware, or a combination of these, to control the operations associated with performing the database operations record sampling and transaction extraction.

Transaction log file read buffer 402 stores the database operation records as they are read from log file 126. In a first exemplary embodiment, log file read buffer 402 is implemented as a circular buffer having a length equal to the transaction span. The length being equal to the transaction span attempts to ensure that if a sampled database operations record is the last record of a transaction, the previous records of transaction are available for extraction, and if the sampled database operations record is the first record of a transaction, at least a transaction span of records following the first record of the transaction will be read and searched for records belonging to the transaction.

Database operation types sampling counters 404 are a set of counters, one for each type of database operation record in the transactions associated with the transaction workload, and are incremented as each associated type of database operation record is read from log file 126. In a preferred embodiment, each type of database operation record is sampled at a regular rate equal to the next lower integer of the reciprocal of the target sample proportion. For example, if the desired sample proportion is defined as 15% of the transaction log file size, the next lower integer of the reciprocal of 0.15 is 6. Thus, each 6th record for each database operation record type is sampled. This might be implemented, for example, using a modulus function of a sampling counter. In certain embodiments, each type of database operation record can have a different target sample proportion, and thus a different sampling rate.

Transactions-to-operations table 406 will include an entry for each different transaction read from log file 126, and will include sub-entries associated with each transaction entry for each database operation record read from log file 126 belonging to the transaction. Committed transactions table 408 will include an entry for each end-of-transaction database operation record read from log file 126. Pending sampled transactions table 410 will contain an entry for each transaction associated with a sampled database operations record for which an end-of-transaction database operation record has not yet been read from log file 126. Sampled transactions table 412 will include an entry for each complete transaction that is extracted from transaction log file read buffer 402.

Read transaction buffer 414 will include one entry per transaction read from log file 126, written to the buffer when the first database operation record of a transaction is read. In a preferred exemplary embodiment, read transaction buffer 414 is implemented as a circular buffer with length equal to the transaction span. The purpose of read transaction buffer 414 is to indicate transaction and associated database operation record entries that can be cleared from other transaction entry tables and buffers in transaction sampling module 142. As each database operation record of a transaction is read from log file 126, the address pointer of read transaction buffer 414 is advanced by one buffer entry. When the address pointer encounters a buffer entry containing a transaction identifier, this indicates that the address pointer has come full circle in the buffer back to the transaction identifier entry, and that a transaction span of log file records has been processed between writing the transaction identifier to the buffer entry and the address pointer returning to the transaction identifier entry. Because a transaction span of log file records has been processed, it is assumed that all database operation records in the transaction have been read from log file 126. If any of the database operation records in the transaction were flagged for sampling, it is assumed that the complete transaction has been extracted from transaction log file read buffer 402, and table and buffer entries associated with the transaction may now be cleared.

In certain implementations, pending sampled transactions table 410 is implemented as a circular buffer with a length equal to the transaction span, similar to the preferred implementation of read transaction buffer 414. In such implementations, similar to the way that read transaction buffer 414 is used, the pending sampled transactions buffer can be used to identify transactions to be cleared from the tables and buffers of transaction sampling module 142 if an end-of-transaction record for a transaction identified in the pending sampled transactions buffer is not read within a transaction span of log file records of an associated first database operation record flagged to be sampled.

Figure 5A:
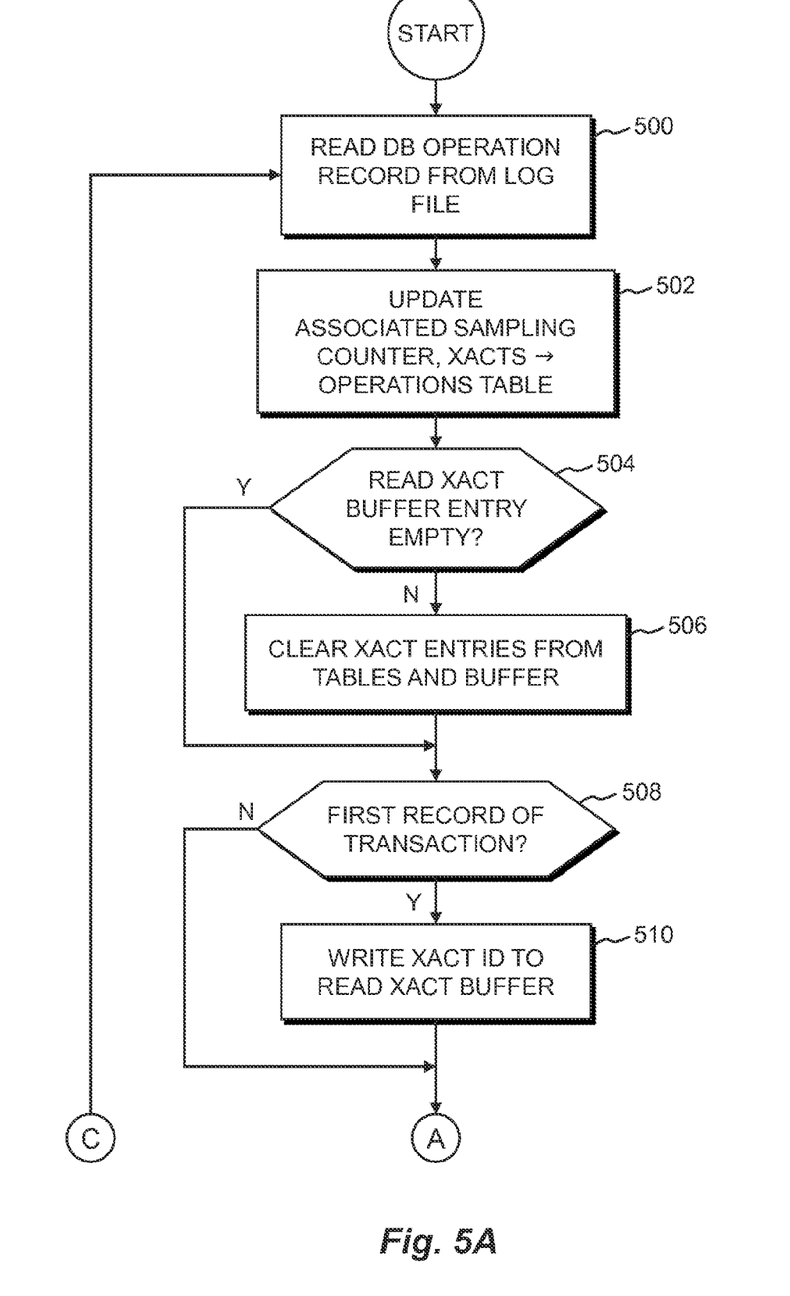
FIGS. 5A, 5B, and 5C are a flowchart depicting operational steps of the transaction sampling module of the transaction sampling system illustrated in FIG. 1, in accordance with second embodiments of the present invention.
Figure 5B:
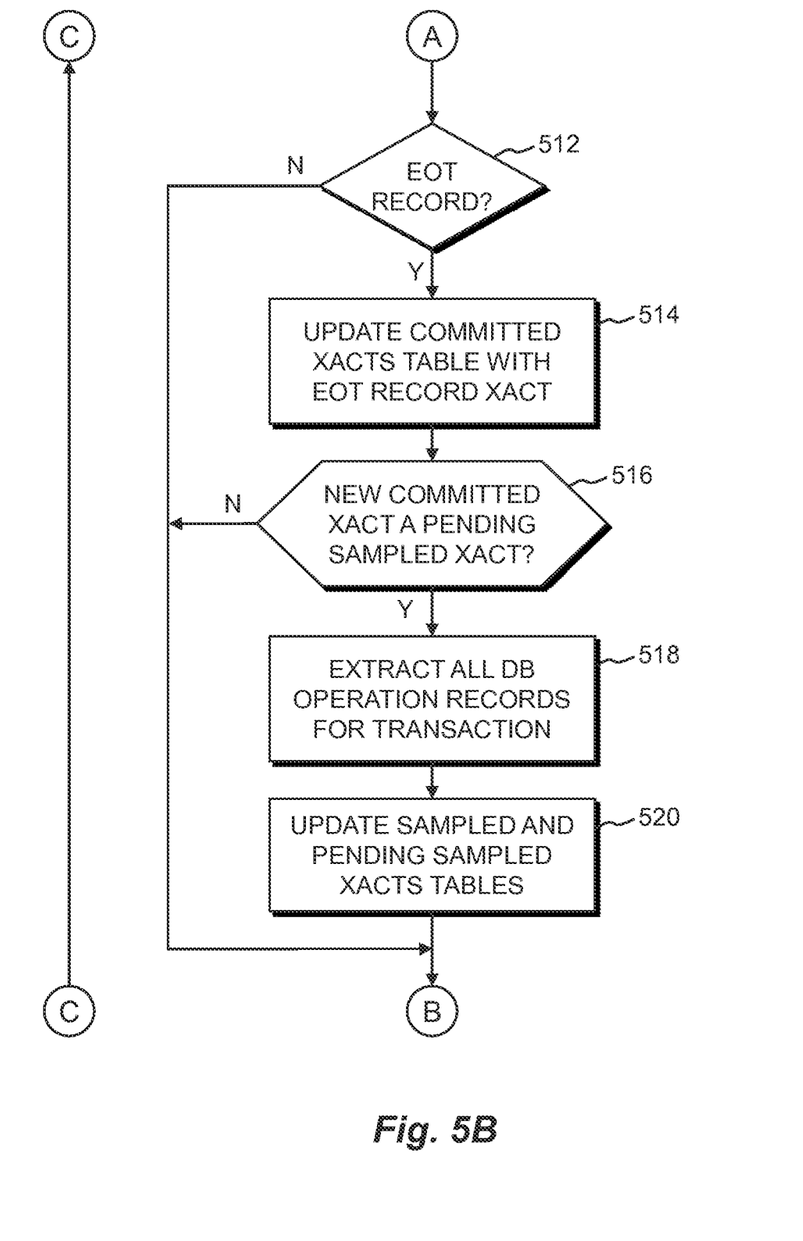
Figure 5C:
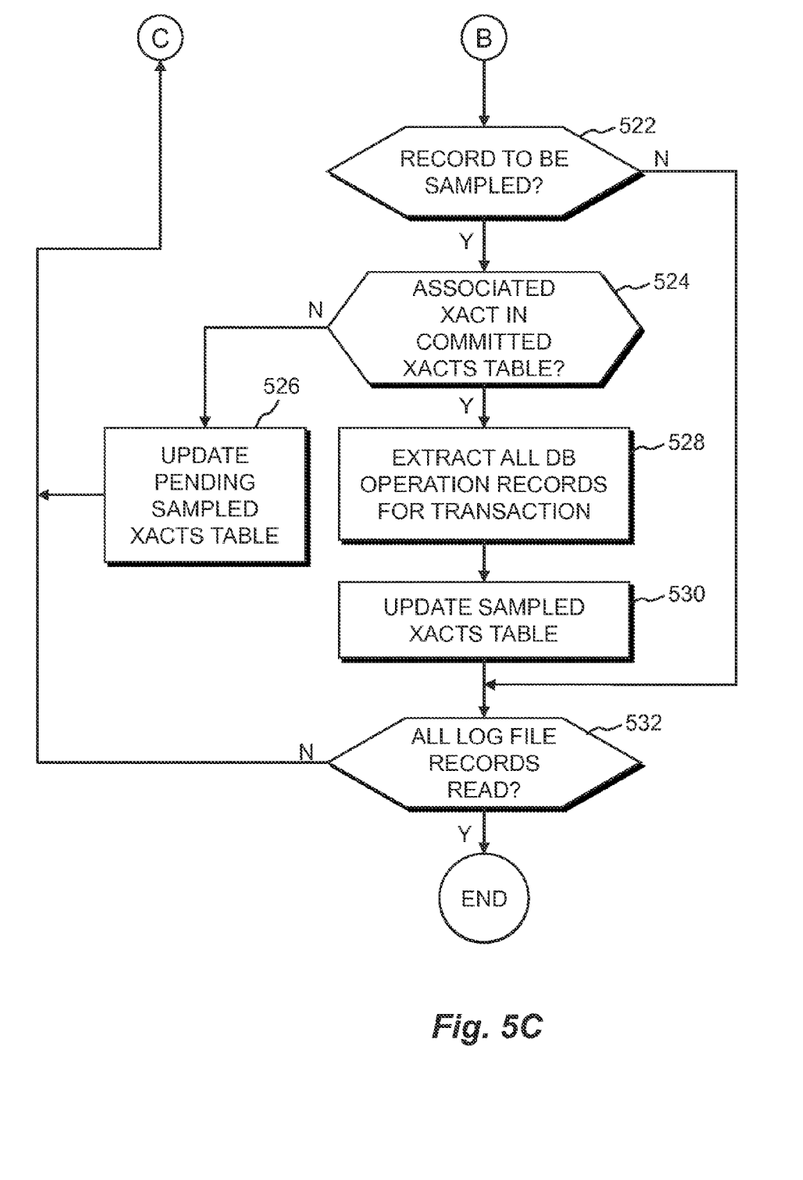

FIGS. 5A, 5B, and 5C are a flowchart depicting operational steps of transaction sampling module 142 of transaction sampling system 100 illustrated in FIG. 1, in accordance with second embodiments of the present invention. In these embodiments, the operation of transaction sampling module 142 is generally divided between two functions. The first function is directed to reading database operation records from log file 126, associating the database operations records to the transactions to which they belong, indicating when complete transactions are available for extracting, and cleaning up the tables and buffers to remove transaction related entries for transactions that have passed out of the active transaction span. The second function is directed to sampling of database operation records and extracting complete transactions associated to the sampled records. As described below, the operational steps associated with these two functions are interleaved to a certain degree.

As each database operation record is read from log file 126 into transaction log file read buffer 402 (step 500), the database operation type sampling counter 404 associated with the database operation record type is incremented, and an entry is added or updated in transactions-to-operations table 406 (step 502).

When the database operation record is read from log file 126, the address pointer for read transaction buffer 414 is advanced to the next entry, and sampling logic module 400 determines if the entry is empty (decision step 504). If the buffer entry is not empty (decision step 504, "N" branch), the buffer entry is cleared, and transaction and database operation record entries associated with the transaction identifier in the read transaction buffer 414 entry are also cleared from transactions-to-operations table 406, committed transactions table 408, and pending sampled transactions table 410 (step 506).

Sampling logic module 400 then determines if the database operation record read from log file 126 is the first record read of the associated transaction that has been read (decision step 508). This is accomplished by determining if an entry for the transaction identifier of the database operation record is in read transactions buffer 414. If the database operation record read from log file 126 is the first record read of the associated transaction, as determined by finding no entry for the transaction identifier of the database operation record in read transactions buffer 414 (decision step 508, "Y" branch), then an entry is written to the read transactions buffer (step 510).

Sampling logic module 400 then determines if the database operation record read from log file 126 is an end-of-transaction record (decision step 512). If the database operation record read from log file 126 is an end-of-transaction record (decision step 512, "Y" branch), committed transactions table 408 is updated with the transaction identifier to which the log file 126 record belongs (step 514).

If the transaction identifier associated with the newly read end-of-transaction record is included in pending sampled transactions table 412 (decision step 516, "Y" branch), indicating that an earlier record associated with the transaction was flagged to be sampled but all database operation records of the transaction had not yet been read from log file 126, then all database operation records for the transaction are extracted (step 518). Entries in transactions-to-operations table 406 are used to identify and locate all records for a transaction in transaction log file read buffer 402. An entry for the extracted transaction is included in sampled transactions table 412, and the corresponding entry in pending sampled transactions table 410 is cleared (step 520).

Sampling logic module 400 then determines if the database operation record read from log file 126 is to be sampled (decision step 522), as described above in relation to FIG. 4 and database operation types sampling counters 404. If the database operation record is not to be sampled (decision step 522, "N" branch), then sampling logic module 400 determines if all database operation records have been read from log file 126 (decision step 532). If all log file records have been read (decision step 532, "Y" branch), then processing ends. If all log file records have not been read (decision step 532, "N" branch), then the next database operation record is read from log file 126 (step 500).

If the database operation record is to be sampled (decision step 522, "Y" branch), then sampling logic module 400 determines if the transaction associated with the database operation record to be sampled has an entry in committed transactions table 408 (decision step 524). If the transaction associated with the database operation record to be sampled does not have an entry in committed transactions table 408 (decision step 524, "N" branch), an entry is added or updated in pending sampled transactions table 410 (step 526), and the next database operation record is read from log file 126 (step 500).

If the transaction associated with the database operation record to be sampled does have an entry in committed transactions table 408 (decision step 524, "Y" branch), then all database operation records for the transaction are extracted from transaction log file read buffer 402 (step 528), and an entry for the extracted transaction is included in sampled transactions table 412 (step 530). If all log file records have been read (decision step 532, "Y" branch), then processing ends. If all log file records have not been read (decision step 532, "N" branch), then the next database operation record is read from log file 126 (step 500).

FIG. 6 depicts a block diagram of components of computing device 110 of transaction sampling system 100 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made within the scope and spirit of the invention.

Computing device 110 can include one or more processors 602, one or more computer-readable RAMs 604, one or more computer-readable ROMs 606, one or more tangible storage devices 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within a system.

One or more operating systems 610, and transaction processing system 120, database management system 130, and transaction analysis system 140 are stored on one or more of the computer-readable tangible storage devices 608 for execution by one or more of the processors 602 via one or more of the respective RAMs 604 (which typically include cache memory). In the illustrated embodiment, each of the computer-readable tangible storage devices 608 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 can also include a R/W drive or interface 614 to read from and write to one or more portable computer-readable tangible storage devices 626. Transaction processing system 120, database management system 130, and transaction analysis system 140 on computing device 110 can be stored on one or more of the portable computer-readable tangible storage devices 626, read via the respective R/W drive or interface 614 and loaded into the respective computer-readable tangible storage device 608.

Computing device 110 can also include a network adapter or interface 616, such as a TCP/IP adapter card or wireless communication adapter (such as a 4G wireless communication adapter using OFDMA technology). Transaction processing system 120, database management system 130, and transaction analysis system 140 on computing device 110 can be downloaded to the computing device from an external computer or external storage device via a network (for example, the Internet, a local area network or other, wide area network or wireless network) and network adapter or interface 616. From the network adapter or interface 616, the programs are loaded into the computer-readable tangible storage device 608. The network may comprise copper wires, optical fibers, wireless transmission, routers, firewalls, switches, gateway computers and/or edge servers.

Computing device 110 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 can comprise hardware and software (stored in computer-readable tangible storage device 608 and/or ROM 606).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for a presentation control system. However, numerous modifications and substitutions can be made without deviating from the scope of the present invention. Therefore, the present invention has been disclosed by way of example and not limitation.

What is claimed is:

1. A computer program product for sampling transactions from multi-level log file records in a log file containing operation records, each operation record of a certain type and each operation record associated with a transaction, one operation record associated with a transaction being an end-of-transaction record indicating a completed transaction, the computer program product comprising:
one or more computer-readable storage media and program instructions stored on the one or more computer-readable storage media, the program instructions comprising:
program instructions to read a plurality of the operation records from the log file into a record store;
program instructions, for each operation record of the plurality of operation records read into the record store, to:
record in a transaction-to-record table an association of the operation record and the transaction to which the operation record belongs;
sample operation records of the plurality of operation records of each operation record type at a predefined sampling rate;
for each sampled operation record:
in response to determining that the sampled operation record is an end-of-transaction record, to extract all operation records that are associated with the transaction, based on the corresponding associations in the transaction-to-record table, from the record store into a data store;
in response to determining that the sampled operation record is not an end-of-transaction record, to record in an extraction-pending table the transaction to which the operation record belongs; and
program instructions, in response to determining that the operation record read from the log file is an end-of-transaction record and the transaction to which the operation record belongs is recorded in the extraction-pending table, to extract all operation records that are associated with the transaction, based on the corresponding associations in the transaction-to-record table, from the record store into the data store.

2. A computer program product in accordance with claim 1, wherein the plurality of the operation records read from the log file further comprises a predefined number of operation records before and after a sample set of operation records and the sampled operation records are selected from the sample set, such that a predefined threshold proportion of all operation records associated with the transactions with which the sampled operation records are associated are in the plurality of operation records.

3. A computer program product in accordance with claim 1, wherein the program instructions to sample operation records of the plurality of operation records further comprises program instructions to randomly sample a predetermined number of operation records of each operation record type in the plurality of operation records.

4. A computer program product in accordance with claim 1, wherein the program instructions to sample operation records of the plurality of operation records further comprises program instructions to sample operation records of each operation record type at a predefined sampling rate associated with the operation record type.

5. A computer system for sampling transactions from multi-level log file records in a log file containing operation records, each operation record of a certain type and each operation record associated with a transaction, one operation record associated with a transaction being an end-of-transaction record indicating a completed transaction, the computer system comprising:

one or more computer processors, one or more non-transitory computer-readable storage media, and program instructions stored on the non-transitory computer-readable storage media for execution by at least one of the one or more processors, the program instructions comprising:

program instructions to read a plurality of the operation records from the log file into a record store;

program instructions, for each operation record of the plurality of operation records read into the record store, to:

record in a transaction-to-record table an association of the operation record and the transaction to which the operation record belongs;

sample operation records of the plurality of operation records of each operation record type at a predefined sampling rate;

for each sampled operation record:

in response to determining that the sampled operation record is an end-of-transaction record, to extract all operation records that are associated with the transaction based on the corresponding associations in the transaction-to-record table, from the record store into a data store;

in response to determining that the sampled operation record is not an end-of-transaction record, to record in an extraction-pending table the transaction to which the operation record belongs; and program instructions, in response to determining that the operation record read from the log file is an end-of-transaction record and the transaction to which the operation record belongs is recorded in the extraction-pending table, to extract all operation records that are associated with the transaction, based on the corresponding associations in the transaction-to-record table, from the record store into the data store.

6. A computer system in accordance with claim 5, wherein the plurality of the operation records read from the log file further comprises a predefined number of operation records before and after a sample set of operation records and the sampled operation records are selected from the sample set, such that a predefined threshold proportion of all operation records associated with the transactions with which the sampled operation records are associated are in the plurality of operation records.

7. A computer system in accordance with claim 5, wherein the program instructions to sample operation records of the plurality of operation records further comprises program instructions to randomly sample a predetermined number of operation records of each operation record type in the plurality of operation records.

8. A computer system in accordance with claim 5, wherein the program instructions to sample operation records of the plurality of operation records further comprises program instructions to sample operation records of each operation record type at a predefined sampling rate associated with the operation record type.

* * * * *